United States Patent
Mazur et al.

(10) Patent No.: US 7,134,273 B2
(45) Date of Patent: *Nov. 14, 2006

(54) EXHAUST EMISSION CONTROL AND DIAGNOSTICS

(75) Inventors: Christopher John Mazur, Canton, MI (US); Devesh Upadhyay, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

This patent is subject to a terminal disclaimer.

(21) Appl. No.: 10/064,957

(22) Filed: Sep. 4, 2002

(65) Prior Publication Data

US 2004/0040289 A1    Mar. 4, 2004

(51) Int. Cl.
*F01N 3/00* (2006.01)
(52) U.S. Cl. ............................ 60/286; 60/274; 60/277; 60/285; 60/301
(58) Field of Classification Search .................. 60/274, 60/276, 277, 286, 295, 301, 303, 285
See application file for complete search history.

(56) References Cited

U.S. PATENT DOCUMENTS

| | | | |
|---|---|---|---|
| 4,847,058 A * | 7/1989 | Odenbrand et al. ....... | 423/239.2 |
| 5,357,749 A * | 10/1994 | Ohsuga et al. ................ | 60/274 |
| 5,891,409 A | 4/1999 | Hsiao et al. | |
| 6,012,282 A | 1/2000 | Kato et al. | |
| 6,089,017 A | 7/2000 | Ogawa et al. | |
| 6,192,675 B1 | 2/2001 | Hirota et al. | |
| 6,233,923 B1 | 5/2001 | Itou et al. | |
| 2002/0039550 A1 * | 4/2002 | Schafer-Sindlinger et al. ... | 423/239.2 |

FOREIGN PATENT DOCUMENTS

WO    WO 99/39809    *    8/1999

OTHER PUBLICATIONS

Urea-SCR: a promising technique to reduce Nox emissions from automotive diesel engines; M. Koebel et al.; Catalysis Today 59 (2000) 335-345.

* cited by examiner

*Primary Examiner*—Thomas Denion
*Assistant Examiner*—Diem Tran
(74) *Attorney, Agent, or Firm*—Allan J. Lippa; Alleman Hall McCoy Russell & Tuttle LLP

(57) ABSTRACT

A diesel engine emission control system uses an upstream oxidation catalyst and a downstream SCR catalyst to reduce NOx in a lean exhaust gas environment. The engine and upstream oxidation catalyst are configured to provide approximately a 1:1 ratio of NO to NO2 entering the downstream catalyst. In this way, the downstream catalyst is insensitive to sulfur contamination, and also has improved overall catalyst NOx conversion efficiency. Degradation of the system is determined when the ratio provided is no longer near the desired 1:1 ratio. This condition is detected using measurements of engine operating conditions such as from a NOx sensor located downstream of the catalysts. Finally, control action to adjust an injected amount of reductant in the exhaust gas based on the actual NO to NO2 ratio upstream of the SCR catalyst and downstream of the oxidation catalyst.

20 Claims, 4 Drawing Sheets

EXHAUST EMISSION CONTROL AND DIAGNOSTICS

CROSS REFERENCE TO RELATED APPLICATIONS

This invention was made with Government support under Prime Contract No. DE-FC26-01NT41103 awarded by the Department of Energy. The Government has certain rights in the invention. This application is cross-referenced to a related application (202-0638) being filed concurrently herewith and having Ser. No. 10/064,956.

BACKGROUND OF INVENTION

1. Field of the Invention

The present invention relates to selective catalytic reduction, and more particularly to methods for controlling and diagnosing such catalytic reduction as well as for controlling internal combustion diesel engines attached to such catalyst systems.

2. Background of the Invention

Diesel internal combustion engines typically operate predominantly lean of stoichiometry. As such, various emission control devices have been used to reduce NOx emissions generated by the engine operation. One such device is a lean NOx catalyst. One example of such a catalyst is a selective catalytic reduction (SCR) catalyst that utilizes a reductant, such as ammonia or urea, to reduce NOx in an oxygen rich atmosphere. Other lean NOx catalysts utilize different reductant, such as diesel fuel or other hydrocarbons, present in the exhaust gas.

One method for using such a catalyst is described in U.S. Pat. No. 5,891,409. Here, an upstream oxidative catalyst is used to convert NO into NO2 in the present of oxygen. Then, a downstream catalyst converts the NO2 to N2, CO2, and H2O in the presence of an injected hydrocarbon.

The inventors of the present invention have recognized a disadvantage with such a system. In particular, the present inventors have recognized that such catalyst systems can be susceptible to sulfur degradation. In other words, sulfur contained in fuel or engine oil can reach the exhaust catalyst and cause degradation of the active components of the catalyst. Such degradation can cause increased emissions. Further, this sulfur degradation is affected by the ratio of NO to NO2 entering the catalyst. In other words, when operating an SCR catalyst downstream of an oxidation catalyst, a mixture of substantially all NO2 can result in rapid sulfur degradation, thereby giving degraded emissions performance.

SUMMARY OF INVENTION

In one aspect of the invention, the above disadvantages are overcome by a method for controlling reductant injection in an exhaust system of an engine having an upstream oxidation catalyst and a downstream lean NOx catalyst The method comprises: determining an amount of NOx exiting the upstream oxidation catalyst; calculating a ratio of NO to NO2 contained in said amount of exiting NOx; calculating an amount of reductant to be injected based on said amount of NOx and said ratio; and adjusting a signal for controlling injected reductant based on said calculated amount of reductant to be injected.

In this way, the present invention achieves efficient use of injected reductant. In other words, the inventors herein have recognized that the operation of the upstream oxidation catalyst affects the NO to NO2 ratio entering the downstream lean NOx catalyst. As such, by determining this ratio, and then controlling the amount of injected reductant in accordance with this ratio, it is possible to more accurately determine how much reductant is needed to obtain a desired NOx efficiency.

In another aspect of the present invention, the above disadvantages are overcome by a method for treating exhausts gasses of an internal combustion engine comprising: combusting fuel containing sulfur; maintaining a ratio of NO to NO2 in the exhaust gasses within 50% of a 1:1 ratio under predetermined operating conditions; passing said maintained exhaust gasses, and a reductant, to a lean NOx catalyst in an engine exhaust; and diagnosing degradation of the treatment of exhaust gasses based on a sensor that measures the exhaust gasses.

By maintaining a ratio of NO to NO2 in the engine near a preselected ratio (in this example about 1:1), it is possible to obtain high conversion of both NO and NO2, even in the presence of sulfur. In other words, when the exhaust gasses are maintained as described above, sulfur has only a minimal affect on NOx conversion in the downstream catalyst. An advantage of the above aspect of the invention is the ability to tolerate fuel with higher sulfur levels and still provide a robust emission control system. Further, if the ratio is not maintained, degradation can be detected by the sensor.

In another aspect of the invention, degradation of the above catalyst configuration can be detected by a diagnostic system for an exhaust gas system of a diesel internal combustion engine. The system comprises: an upstream oxidation catalyst for converting a portion of incoming NO into NO2 a downstream lean NOx catalyst for converting at least some of said NO and NO2 exiting said upstream oxidation catalyst into nitrogen in the presence of a reductant; a sensor coupled downstream of said lean NOx catalyst; and a controller for determining whether said upstream oxidation catalyst is providing a preselected exiting NO to NO2 ratio of based at least on said sensor and said upstream catalyst is within a predetermined temperature range, and providing an indication of degradation of said upstream catalyst based on said determination.

By monitoring whether the preselected ratio is within acceptable limits, it is possible to determine when sulfur degradation can result in the downstream catalyst due to degradation of maintaining the preselected NO to NO2 ratio. In other words, the present invention can recognize when the NO to NO2 ratio of the exhaust gas entering the downstream catalyst is such that it reduces NOx conversion and sulfates the downstream catalyst.

BRIEF DESCRIPTION OF DRAWINGS

The advantages described herein will be more fully understood by reading an example of an embodiment in which the invention is used to advantage, referred to herein as the Description of Preferred Embodiment, with reference to the drawings, wherein.

DETAILED DESCRIPTION

Figure 1:
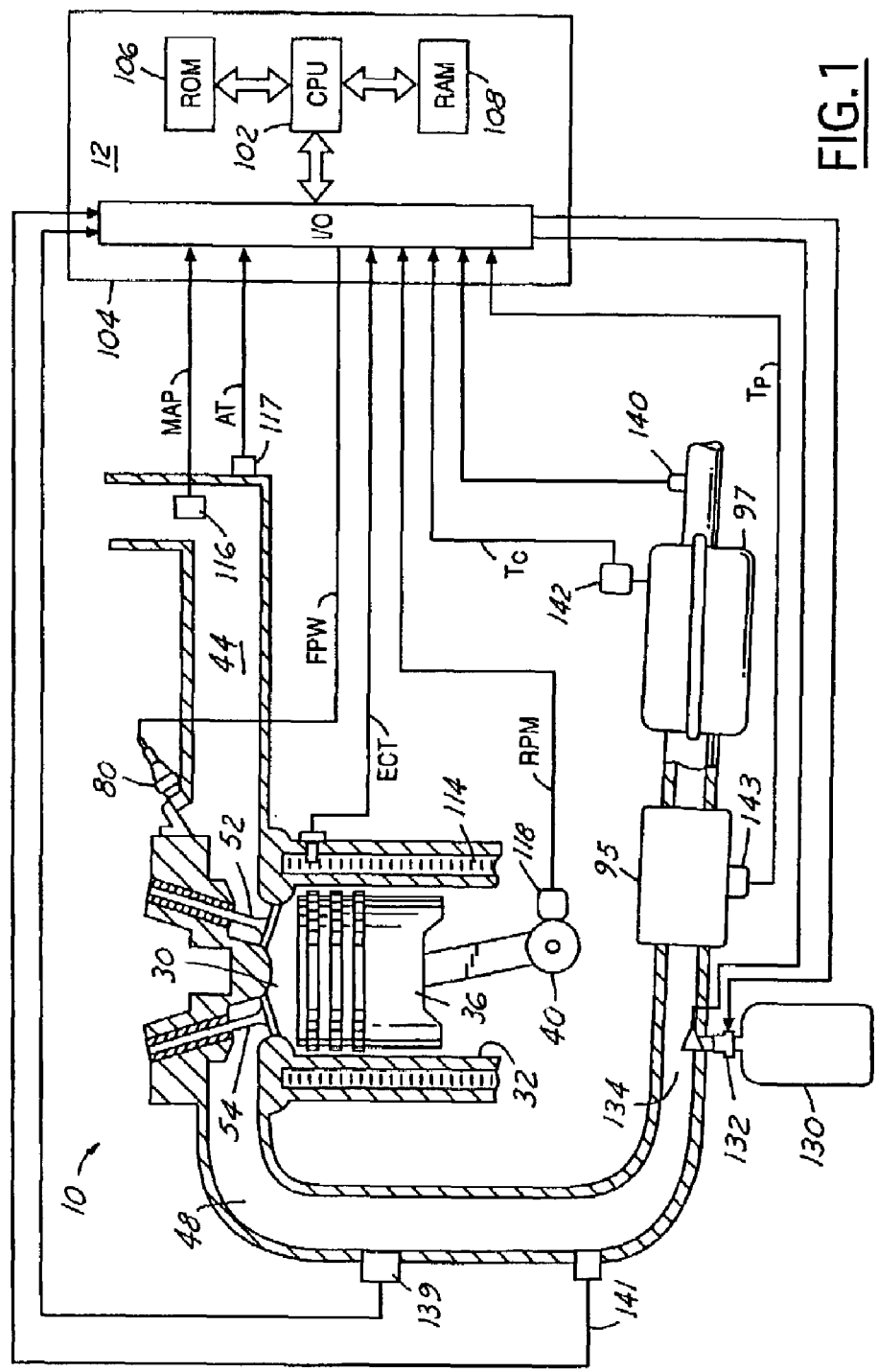
FIG. 1 is a schematic diagram of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Fuel quantity, controlled by signal FPW, and injection timing are both adjustable. Fuel is delivered to fuel injector 80 by a diesel fuel system (not shown), including a fuel tank, fuel pump, and fuel rail (not shown). The fuel contained in the fuel system includes various impurities and, in particular, varying amounts of sulfur. As described herein, sulfur has consistently cause disadvantages related to sulfur degradation of catalytic converters. Attempts to obtain sulfur-free fuel have, as of yet, been unsuccessful in the U.S. and Europe. However, according to the present invention, as described herein, a system and method for operation where sulfur degradation effects on catalytic converts can be minimized has been found and used to advantage.

Returning to FIG. 1, in an alternative embodiment, the engine may be configured such that the fuel is injected directly into the cylinder of the engine, which is known to those skilled in the art as a direct injection engine. i.e., injector 80 would be located to inject fuel directly into cylinder 30.

Reducing agent, for example, ammonia, urea, or diesel fuel, is stored in storage vessel 130 coupled to exhaust manifold 48 upstream of first catalyst 95 and second catalyst 97. First, catalyst 95 is an oxidation catalyst that converts a portion of incoming NO to $NO_2$. Also, catalyst 97 is lean NOx catalyst capable of reducing NOx in an oxygen rich environment. In one example, catalyst 97 is a urea SCR (selective catalytic reduction) catalyst. Efficiency of catalyst 97 is increased in the presence of a reducing agent and varies with temperature, as described below herein.

Control valve 134 controls the quantity of reducing agent delivered to the exhaust gases entering catalysts 95 and 97. In one example, the reducing agent is ammonia, a urea solution, or diesel fuel. Pump 132 pressurizes the reducing agent supplied to control valve 134. Pump 132 and control valve 134 are both controlled by controller 12. NOx sensor 140 is shown coupled to exhaust manifold 48 downstream of catalyst 97. Temperature sensor 142 coupled to catalyst 97 provides an indication of the temperature (T) of catalyst 97. Alternatively, catalyst temperature (T) can be estimated, as described later herein with particular reference to FIG. 6. Similarly, first catalyst temperature (Tp) can be read from sensor 143 or estimated, using methods known to those skilled in the art, based on exhaust gas temperature.

In an alternative embodiment, the reductant can be injected upstream of catalyst 97 but downstream of catalyst 95. In this case, the location of the reductant injector would be between catalysts 95 and 97. Alternatively, the reductant injector can be located upstream of the oxidation catalyst.

Controller 12 is shown in FIG. 1 as a conventional microcomputer, including microprocessor unit 102, input/output ports 104, read-only memory 106, random access memory 108, and a conventional data bus. Controller 12 is shown receiving various signals from sensors coupled to engine 10, in addition to those signals previously discussed, including engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; and an engine speed signal (RPM) from engine speed sensor 118 coupled to crankshaft 40. Upstream NOx sensor 139 also provides a signal to controller 12 indicative of the amount of NOx (both NO and $NO_2$) generated in the exhaust gas. Alternatively, this sensor can be deleted and the controller can generate an estimate of NOx generated by the engine based on operating conditions such as engine speed and load. Similarly, a third NOx sensor 141 can optionally be placed downstream of the oxidation catalyst and upstream of the SCR catalyst.

As will be described more fully below, by maintaining a ratio of NO to NO2 before the catalyst near 1:1, it is possible to obtain high conversion of both NO and NO2, even in the presence of sulfur. In other words, when the exhaust gasses are maintained as described above, catalyst deterioration due to sulfur is delayed. An advantage of this is the ability to tolerate fuel with higher sulfur levels and still provide a robust emission control system. Additionally, a feed gas NOx composition of 50% NO and 50% NO2 provides for the fastest NOx reduction reaction rates over the SCR catalyst, thereby allowing the highest levels of NOx conversion efficiencies. However, if the upstream oxidation catalyst (which creates, in one example, this preferred NO to NO2 ratio upstream of the SCR catalyst) becomes degraded, then sulfur degradation of the downstream catalyst may occur.

Figure 2:
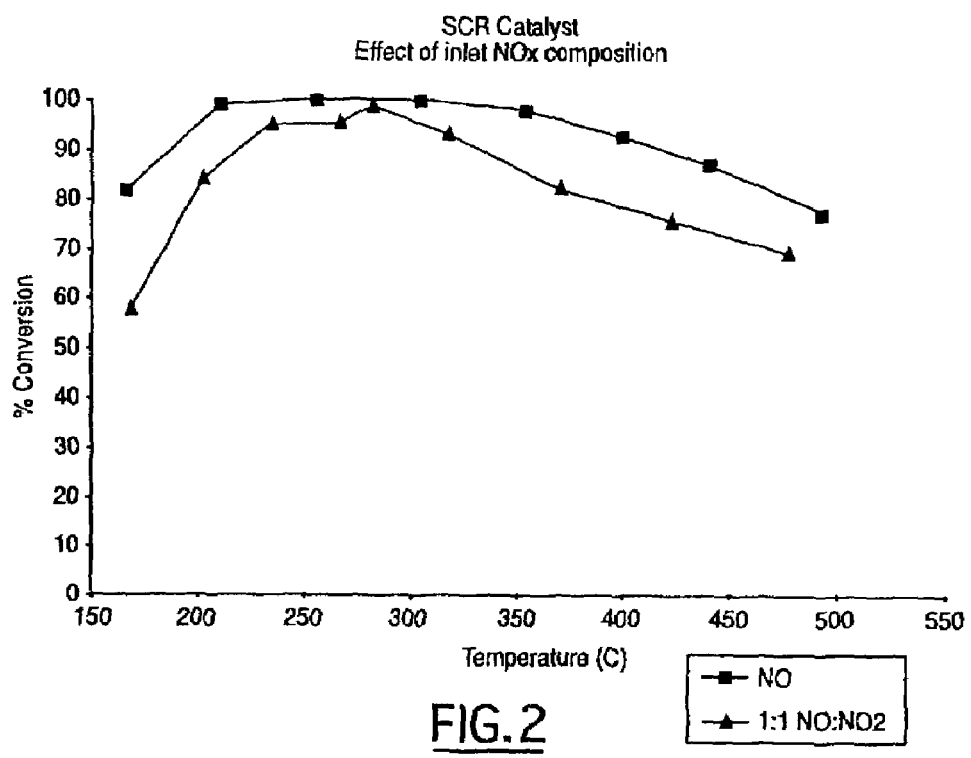
FIGS. 2–4 are graphs illustrated test results related to the present invention.

FIG. 2 illustrates experimental data of an SCR catalyst across various temperatures. In particular, the Figure illustrates $NO_x$ conversion from approximately 150° C. to approximately 550° C. The data points indicated by a triangle-line illustrates NO conversion ($NO_2$), the following data points indicated by a square-line illustrate $NO_x$ conversion for approximately a 1:1 $NO:NO_2$ mixture. As such, FIG. 2 illustrates that by keeping approximately a 1:1 $NO:NO_2$ molar ratio in the exhaust feed gas, $NO_x$ conversion can be optimized.

Figure 3:
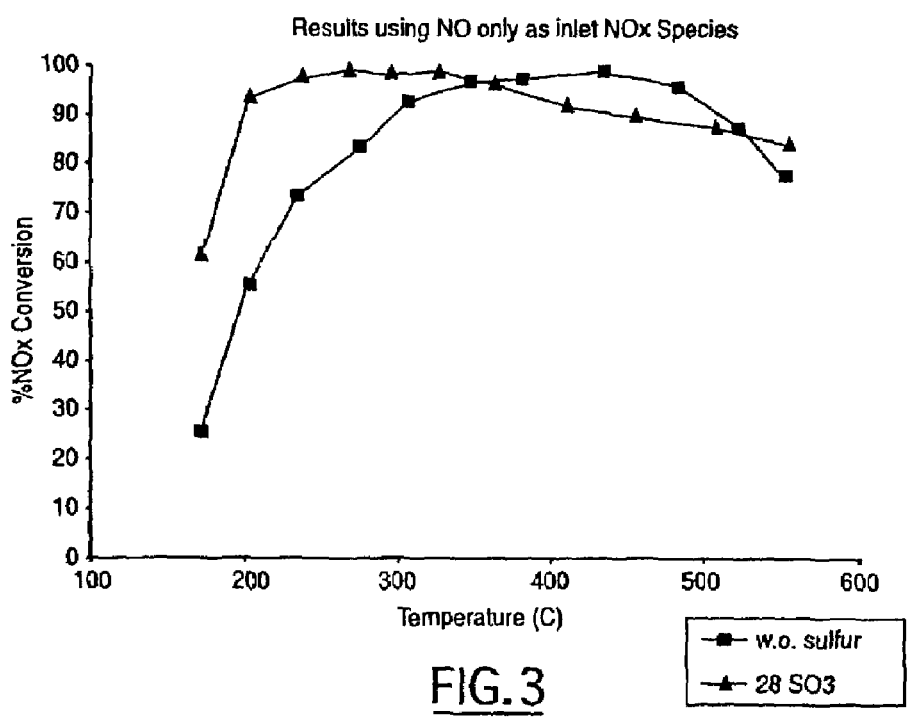

FIG. 3 illustrates $NO_x$ conversion when the exhaust gas comprises solely NO. In particular, the Figure shows $NO_x$ conversion of NO with and without sulfur. The data indicated by a triangle-line shows catalyst performance when the inlet gas includes NO and no sulfur. The data indicated by a square-line shows catalyst performance with sulfur. As the data indicates, when the feed gas is entirely composed of NO, sulfur adversely affects NOx conversion.

Figure 4:
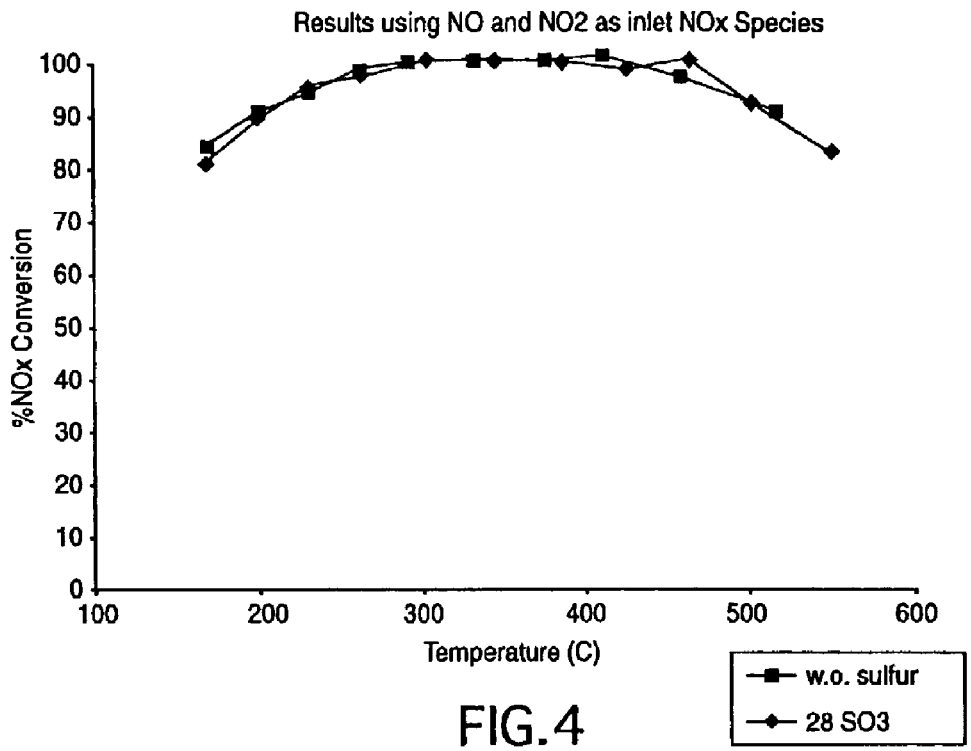

FIG. 4 illustrates NOx conversion with and without sulfur when the inlet ratio of NO and $NO_2$ is maintained within a predetermined range (approximately 1:1). The data indicated by a diamond-line is for exhaust gases without sulfur, while the data indicated by a square-line is for exhaust gases containing sulfur. As FIG. 4 illustrates, by keeping approximately a 1:1 $NO:NO_2$ ratio, sulfur effects on NOx conversion can be reduced. The inventors of the present invention recognize that significant benefits can still be expected even if the ratio of $NO:NO_2$ fluctuates within 50%; however, approximately a 1:1 molar ratio can yield a minimum amount of $NO_2$ required. In other words, up to approximately a 20:80 ratio can be acceptable depending on operating conditions such as temperature. i.e., while it is desirable to maintain near a 1:1 ratio, advantageous results can be obtained by having the ratio within approximately 50% of 1:1.

As described above with regard to FIG. 1, the present invention, in one embodiment, utilizes an upstream oxidation catalyst to convert some exhaust NO to $NO_2$. In particular, the catalyst composition can be adjusted to match a particular engine exhaust characteristic. In this way, it is possible to provide approximately a 1:1 NO to $NO_2$ ratio entering the downstream SCR catalyst. However, there are other methods which can be utilized to provide the desired NO to $NO_2$ ratio of gases entering the SCR catalyst. For example, this system may delete the upstream oxidation catalyst and adjust engine-operating conditions to provide the desired ratio. For example, the ratio may be provided by adjusting parameters such as, for example, exhaust gas recirculation amount, injection timing, air-fuel ratio, or other parameters, or combinations of these parameters.

As described above, various methods can be used to attempt to provide the desired NO to $NO_2$ ratio entering the SCR catalyst. However, due to engine aging, vehicle aging, and various environmental factors, the attempts to provide the desired ratio may degrade. As a result, the catalyst NOx conversion of the SCR catalyst may become sensitive to sulfur degradation. As a result, the present invention provides a diagnostic method for detecting degradation of the lean NOx catalyst. One embodiment of such a diagnostic system is described in FIG. 5.

Figure 5:
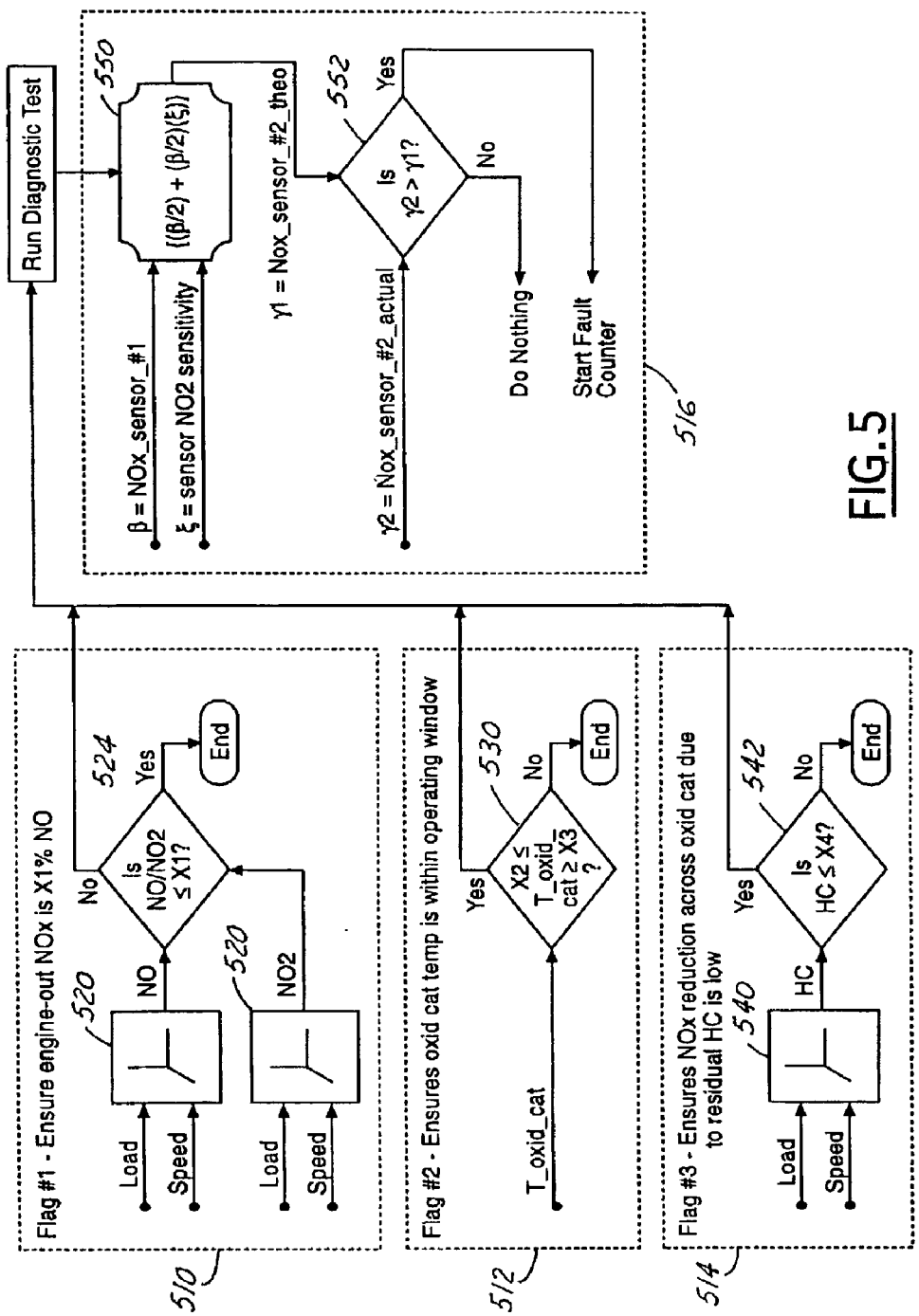
FIG. 5 is a high level flow chart of various operations performed by a portion of the embodiment shown in FIG. 1.

Referring now to FIG. 5, a routine is described for performing catalyst diagnostics. In general terms, three flags are utilized in blocks 510, 512, and 514, respectively, to determine whether to enable catalyst diagnostics. If the result of each of these flags indicates that diagnostics should be performed, the routine moves to block 516. The details of these blocks are described below.

Referring now to block 510, the routine sets flag No. 1 based on a determination whether the engine out NOx is a predetermined percentage (X1) of NO. In particular, in step 520, the routine determines an estimate of engine out NO based on engine speed and load. Further, in step 522, the routine determines an estimate of engine out $NO_2$ based on engine speed and load.

Various other parameters can also be used in these engine maps to determine engine out NO and $NO_2$ such as, for example, engine temperature, injection timing, air-fuel ratio, and various other parameters. Based on the estimated NO and $NO_2$, the routine determines in step 524 whether the estimated ratio of NO to $NO_2$ is less than or equal to X1. If the answer to step 524 is "yes", the routine does not set the flag 1 and the routine ends. If the answer to step 522 is "no", the routine sets flag No. 1 to allow catalyst diagnostics.

Referring now to block 512, the routine determines whether to set flag No. 2. In general terms, block 512 ensures that the temperature of the upstream oxidation catalyst is within a predetermined operating window. In particular, in step 530, the routine determines whether an estimated oxidation catalyst temperature, or measured oxidation catalyst temperature (T_oxid_cat), is greater than or equal to an upper threshold temperature (X3) and greater than a lower predetermined temperature threshold (X2). If the answer to step 530 is "no", the routine ends. Otherwise, if the answer to step 530 is "yes", the routine sets flag No. 2 to enable catalyst diagnostics.

Referring now to block 514, a routine for setting flag No. 3 is described. In general terms, block 514 ensures that NOx reduction across the oxidation catalyst due to residual hydrocarbons is less than a predetermined amount. In particular, in step 540, the routine determines an estimate of residual hydrocarbons based on engine speed and load. As described above with respect to steps 520 and 522, various other parameters can be used in this engine map. Then, in step 542, the routine determines whether this residual hydrocarbon amount (HC) is less than a predetermined hydrocarbon threshold (X4). When the answer to step 542 is "no", the routine ends. If the answer to step 542 is "yes", the routine sets flag No. 3 to allow catalyst diagnostics.

When each of flags 1, 2, and 3 are set to allow catalyst diagnostics, the routine continues to block 516.

First, in step 550, the routine utilizes the NOx sensor output of the upstream NOx sensor ($\beta$) and the sensitivity of the sensor ($\xi$) to calculate an estimate of the downstream NOx sensor output ($\gamma 1$). Then, in step 552, the routine determines whether this estimate of the downstream NOx sensor output is greater than the actual downstream NOx ($\gamma 2$). If the answer to step 552 is "yes", the routine indicates degradation of the exhaust system. Otherwise, the routine ends.

Further, in an alternate embodiment, the present invention uses a counter which is incremented at each determination of "yes" of Step 552. Then, when the counter reaches a predetermined count value, catalyst system degradation is indicated, for example, via a light on the vehicle dashboard.

In other words, the present invention thus overcomes the NOx sensors' inability to decipher between NO and $NO_2$. In other words, since NOx sensors can show different sensitivity towards NO and $NO_2$ due to masked fusion principles, by utilizing the method according to the present invention, it is possible to calculate the limit of the downstream NOx sensor reading if the ratio of NO:$NO_2$ is maintained approximately near 1:1. Further, those skilled in the art will recognize, in view of the present invention, that in an alternate embodiment, the upstream NOx sensor can be replaced by estimates of feed gas NOx based on engine operating conditions such as engine speed and load.

Control of injected reductant, in this example, urea, is carried out according to the following approach. To determine the amount of urea to inject, the NO:NOx ratio after the oxidation catalyst is denoted as (x), which is between 0 and 1. Further, the NOx values upstream and downstream of the oxidation catalyst are denoted as B and G, respectively. Thus, the theoretical reading of the downstream sensor would be $x*B+(1-x)B*E$, where E is the sensitivity of the sensor to NO2. The measured NOx from the downstream sensor can be denoted as Gm. Then, $x*B+(1-x)B*E=Gm$. Rearranging gives: $x=(Gm+E*B)/(B*(1-E))$. Thus, the NOx value B can be either measured or estimated from engine operating conditions, and the value E is determined based on the characteristics of the sensor design, for example, from the sensor specification. So, once the value x (which is the NO to NO2 ratio entering the SCR catalyst), the stoichiometric reductant amount, e.g. urea amount, can be determined and injected.

For example, assuming a 32.5% aqueous solution of urea, the following stoichiometric reactions can be assumed:

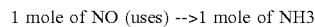

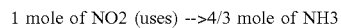

These calculations yield a required mass flow of urea in mg/sec as:

Massflow_urea=0.0177
(PNOx*massflow_exhaust_gas)*(4−x), where, as above, x is the molar concentration ratio of NO to NO2 in the exhaust gas stream entering the SCR catalyst, PNOx is the exhaust NOx concentration in PPM, and massflow_exhaust_gas is the mass flow rate of exhaust gasses in KG/min.

Figure 6:
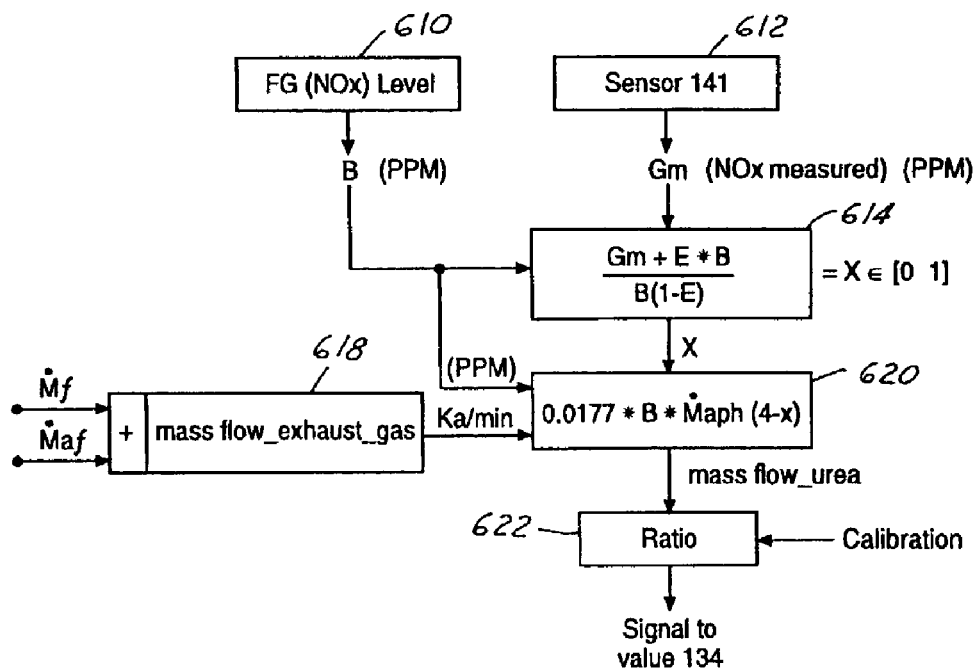
FIG. 6 is a high level flow chart showing an example control approach.

The control approach is illustrated specifically in FIG. 6. Block 610 provides the feed gas NOx level in PPM as parameter B to block 614. This feed gas NOx amount can be either measured or estimated. If estimated, the amount can be mapped and calibrated as a function of engine speed and load.

Further, block 612 provides the reading from sensor 141 as Gm (the measured NOx PPM) to block 614. Block 614 then calculates the value x according to the equation derived above and then feeds this value to block 620. Also, block 618 calculates the exhaust mass flow rate based on the sum of the fuel flow rate (mf) and the airflow rate (Maf), and provides this value to block 620. Block 620 calculates the desired urea flow rate massflow_urea for stoichiometric reaction between the NO, NO2, and urea. This desired flow rate is adjusted by a calibration value in block 622 and then used to adjust injected urea via valve 134.

The invention claimed is:

1. A method for controlling reductant injection in an exhaust system of an engine having an upstream oxidation catalyst and a downstream lean NOx catalyst, the method comprising:
determining an amount of NOx exiting the upstream oxidation catalyst;
calculating a ratio of NO to NO2 contained in said amount of exiting NOx based on engine operating conditions;
calculating an amount of reductant to be injected based on said amount of NOx and said ratio; and
adjusting a signal for controlling injected reductant based on said calculated amount of reductant to be injected.

2. The method recited in claim 1, wherein said determining said amount of exiting NOx comprises reading a NOx sensor value coupled in the exhaust gas upstream of said lean NOx catalyst and downstream of said oxidation catalyst.

3. The method recited in claim 1, wherein said engine operating conditions comprise an engine feed gas NOx amount.

4. The method recited in claim 3, wherein said feed gas NOx amount is calculated based on engine speed and load.

5. A system for an exhaust gas system of a diesel internal combustion engine, the system comprising:
an upstream oxidation catalyst for converting a portion of incoming NO into NO2;
a downstream lean NOx SCR catalyst for converting at least some of said NO and NO2 exiting said upstream oxidation catalyst into nitrogen in the presence of a reductant;
a reductant injection system coupled upstream of said lean NOx catalyst and downstream of said upstream oxidation catalyst;
a sensor coupled upstream of said lean NOx catalyst; and
a controller for determining an amount of NOx exiting the upstream oxidation catalyst, calculating a ratio of NO to NO2 contained in said amount of exiting NOx, adjusting an amount of reductant to be injected by said reductant system based on said amount of NOx and said ratio, and determining degradation of the upstream oxidation catalyst based on said ratio of NO to NO2.

6. The system recited in claim 5, wherein said sensor is a NOx sensor.

7. The system recited in claim 5, wherein said reductant includes urea.

8. The system recited in claim 5, wherein said reductant system includes a control valve that receives a signal from said controller.

9. A method for treating exhausts gasses of an internal combustion engine, comprising:
combusting fuel containing sulfur;
maintaining a ratio of NO to NO2 in the exhaust gasses within 50% of a 1:1 ratio under predetermined operating conditions;
passing said maintained exhaust gasses, and a reductant, to a lean NOx catalyst in an engine exhaust; and
diagnosing degradation of the treatment of exhaust gasses based on a sensor that measures the exhaust gasses.

10. The method recited in claim 9, wherein said maintaining further comprises providing an upstream catalyst.

11. The method recited in claim 9, wherein said maintaining further comprises adjusting an exhaust gas recirculation amount of the engine.

12. The method recited in claim 9, wherein said reductant is urea.

13. The method recited in claim 9, wherein said predetermined operating conditions include engine speed, engine load, and temperature.

14. A system for reducing exhaust gas NOx of a diesel internal combustion engine, the system comprising:
a fueling system coupled to the engine for providing diesel fuel for combustion that includes sulfur;
an upstream oxidation catalyst for converting a first portion of incoming NO into NO2 in the combustion gas to provide an exiting NO to NO2 ratio of within 50% of a 1:1 molar ratio;
a downstream lean NOx SCR catalyst for converting said a second portion of NO and NO2 exiting said upstream oxidation catalyst in the presence of a reductant; and
a diagnostic system for determining degradation of at least one of said upstream oxidation catalyst and said downstream lean NOx SCR catalyst.

15. The system recited in claim 14, wherein said reductant is urea.

16. The system recited in claim 14, wherein downstream catalyst converts said NO and NO2 when the exhaust gas has a lean air-fuel ratio.

17. The system recited in claim 16, wherein said reductant is urea.

18. The system recited in claim 14, further comprising a first NOx sensor located downstream of said downstream lean NOx catalyst.

19. The system recited in claim 18, further comprising a second NOx sensor located between said upstream oxidation catalyst and said downstream lean NOx catalyst.

20. The system recited in claim 19, further comprising a diagnostic controller for determining whether said downstream catalyst is contaminated with sulfur based on said first and second NOx sensors.

* * * * *